F. G. BUTLER.
Horse-Rakes.
No. 157,984. 2 Sheets--Sheet 1. Patented Dec. 22, 1874.
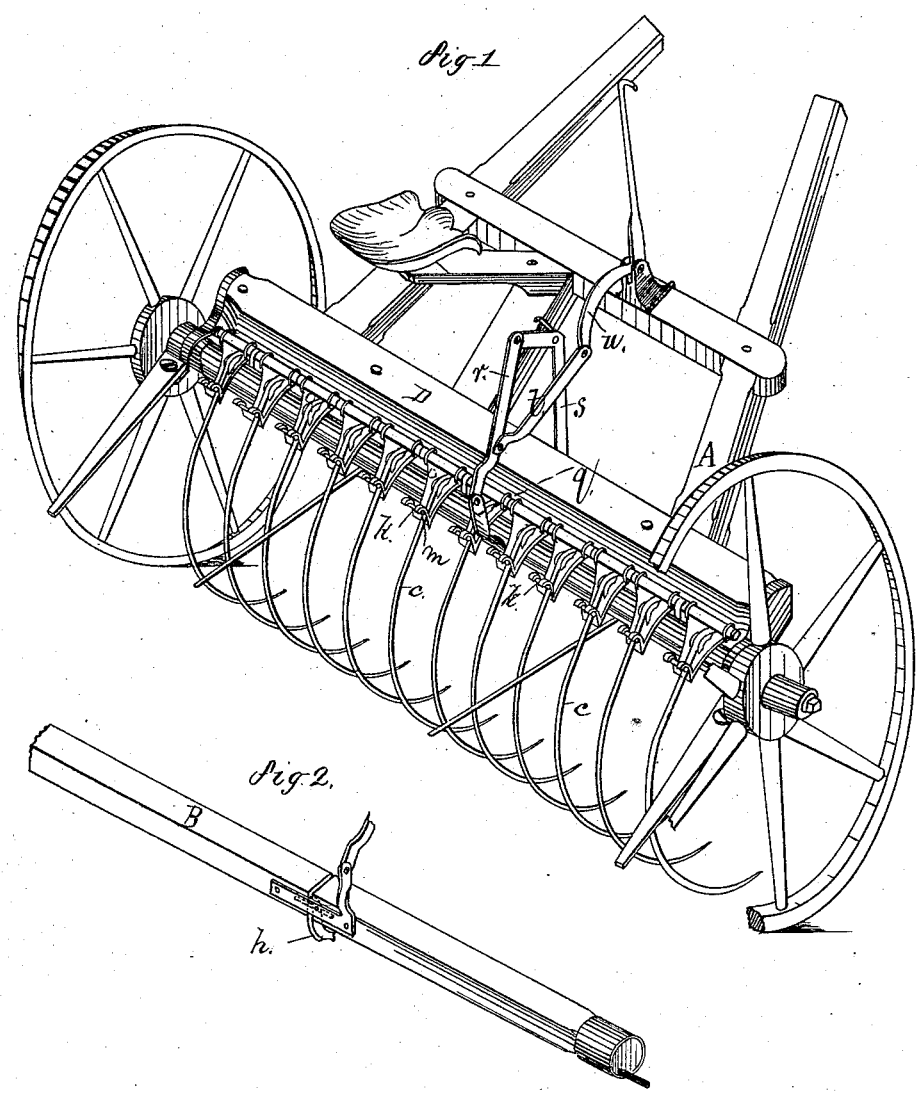
Witnesses
Geo. T. Smallwood
C. Hickenlooper
Inventor
Francis G. Butler
by John J. Halsted
his Atty

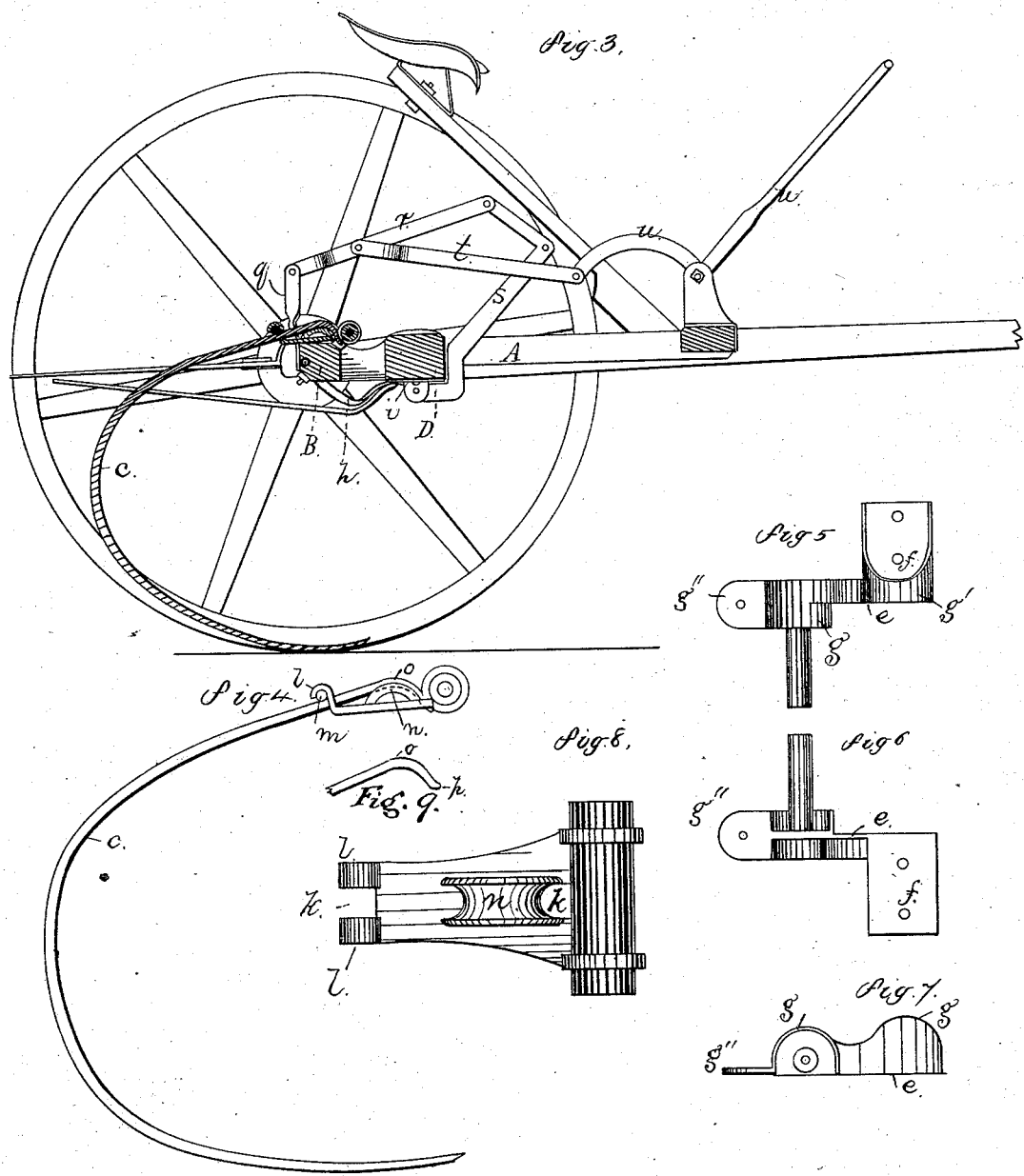

UNITED STATES PATENT OFFICE.

FRANCIS G. BUTLER, OF BELLOWS FALLS, VERMONT, ASSIGNOR TO THE VERMONT FARM MACHINE COMPANY, OF SAME PLACE.

IMPROVEMENT IN HORSE-RAKES.

Specification forming part of Letters Patent No. 157,984, dated December 22, 1874; application filed October 5, 1874.

*To all whom it may concern:*

Be it known that I, FRANCIS G. BUTLER, of Bellows Falls, in the county of Windham and State of Vermont, have invented certain new and useful Improvements in Horse Hay-Rakes; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My improvements consist in making the stud-axles of a special construction, including a covering for wheel-hub and for the rock-shaft bearing, and with a rearward extension, as hereinafter set forth; in a special construction of devices for rocking the shaft to lift the rake-teeth to discharge the hay; in a central support sustaining in a novel manner a divided rocking shaft; in a special means and method for holding the steel teeth to place in their thimbles; and in other details hereinafter set forth.

Figure 1 is a perspective view of a horse hay-rake with my improvements thereon. Fig. 2 shows the divided rock-shaft. Fig. 3 is a vertical section; Fig. 4, a tooth and its fastening device on an enlarged scale; Figs. 5, 6, and 7, views of my improved short axle and accompanying parts; Fig. 8, a top view of my improved thimble, twice the size shown in Fig. 4, and Fig. 9 shows the peculiar bend of the steel tooth at its upper or fastening end.

A is the frame; B, the rocking shaft on which the rake-teeth $c$ are attached, and this shaft has its journals or centers of motion nearly in line with the centers or axes of the wheels, the shaft itself being, however, preferably, somewhat eccentric to such journals. This position of the shaft insures, under all movements of the horse and vehicle, for all variations of the surface of the ground, and, whether the shafts be hitched high or low in the harness, the proper relation of the teeth to the ground, for it will be seen that, as the frame is hung perfectly independent of the hanging of the shaft B, it turns freely on the same line of center with the shaft B, and the latter if swung around the whole one hundred and eighty degrees would not at all change the position of the rake-teeth or their tips. To produce this result, the cross-beam D of the frame, and which I designate the main beam, is located considerably forward of the wheel-journals.

The axles are of a special and peculiar construction, and have several important parts for different functions and uses. They are cast each in a single piece, and comprise the journals for the wheels, offsets $e$ extending forward of the journals, sockets $f$ for attaching and supporting the main beam of the frame, enabling the rock-shaft B to occupy its position between the journals, and also coverings $g$ and $g'$ for wheel-hubs and for the rock-shaft bearings, and rearward extensions $g''$ for attaching outside stripper-bars.

The rock-shaft B I divide, preferably, into two parts about centrally, connecting them axially by a bolt, pin, or equivalent means, and support these parts centrally by means of a piece or arm, $h$, which forms part of the plate $i$, which is fastened to the under side of the cross-beam D, and on this support the rock-shaft is upheld and sustained, so that it may turn in the axial line of that shaft.

My means and method of fastening each tooth to place are as follows: The teeth I make of steel, that they may have a springing or resilient quality. The thimble I construct with a vertical slit, $k$, at its outer end, hooks or eyes $l$ to receive a pin, $m$, a curved groove or fulcrum, $n$, on the upper side, in which the bent head $o$ of a tooth is lodged, and a hole, $k'$, through its bed to admit the tip of the tooth, and to the tip of the head of the tooth I give an outward bend, $p$.

The bent head $o\ p$ of the tooth is peculiar, and very important. Being made of steel, I give it an easy, gentle curve at $o$, thus avoiding that liability to break either in forming or in use, which is so often the case in those bent at nearly a right angle. The tip $p$ has also only a gentle bend, so that there is nowhere in the whole tooth a weak part, and as these gentle bends can be made by heating the steel to a lower temperature than is necessary for a sharper bend, there is less liability of destroying the temper and springing quality of the tooth when forming it.

To put a tooth to place, I lodge its bent head in the groove, the tip entering the hole so as to abut against the under side of the thimble; then, pressing down the tooth into and through the slit, insert a cross-pin in the hooks or eyes $m$, and above the tooth. The tooth is thus kept sprung down, and in that condition locked by the pin firmly to place, the resilience of the spring-tooth keeping a constant upward bearing against the pin, and securely holding all to place. It will be seen that a tooth can be removed in a moment by simply removing the pin.

The lifting or dumping devices are as follows: $q$ is the dumping-arm, fastened to the rocking shaft B; $r$, a bar connecting it at its forward end to the bent foot-lever $s$, the latter being pivoted on the plate $i$ on the under side of the main bar. About midway of the bar $r$ is pivoted one end of a link or bar, $t$, whose forward end is pivoted to the rear arm of the hand-lever $u$. The foot-piece is located at about the angle of the bent foot-lever $s$, which, being pivoted under bar D, causes the rock-shaft and teeth to turn. The foot and hand levers, when both are used, actuate the same bar, $r$, and give a pull thereon in the same line of direction, while either the foot or the hand, or both, may be used at option.

I claim—

1. A stud-axle constructed with coverings for wheel-hubs and for the rock-shaft bearings, and with a rearward extension, $s''$, for holding an outside stripper-bar, all cast together in one piece.

2. The lifting device, as shown and described, consisting of the bar $r$ attached at its rear end directly to the dumping-arm of the rock-shaft, at its forward end directly to the foot-lever $s$ pivoted beneath the bar, and connected midway, by means of the link $t$, with the hand-lever, the latter having no other connection with the lifting devices.

3. The tooth-thimbles, constructed with the grooved fulcrum $n$ for the curved part of the tooth, the opening $k'$ for its tip $p$, and the eyes $l\ l$ for the fastening-pin.

4. The central support $h$, sustaining a divided rocking-beam, B, by means of a pin, the inner ends of which beam are connected by said pin, upheld by such support, and connecting the two parts of the beam in the line of its center of motion.

FRANCIS G. BUTLER.

Witnesses:
N. C. BEACH,
W. D. McARTHUR.